Feb. 27, 1951      H. E. MOREY      2,543,465
ANIMAL FEEDER
Filed Dec. 21, 1945
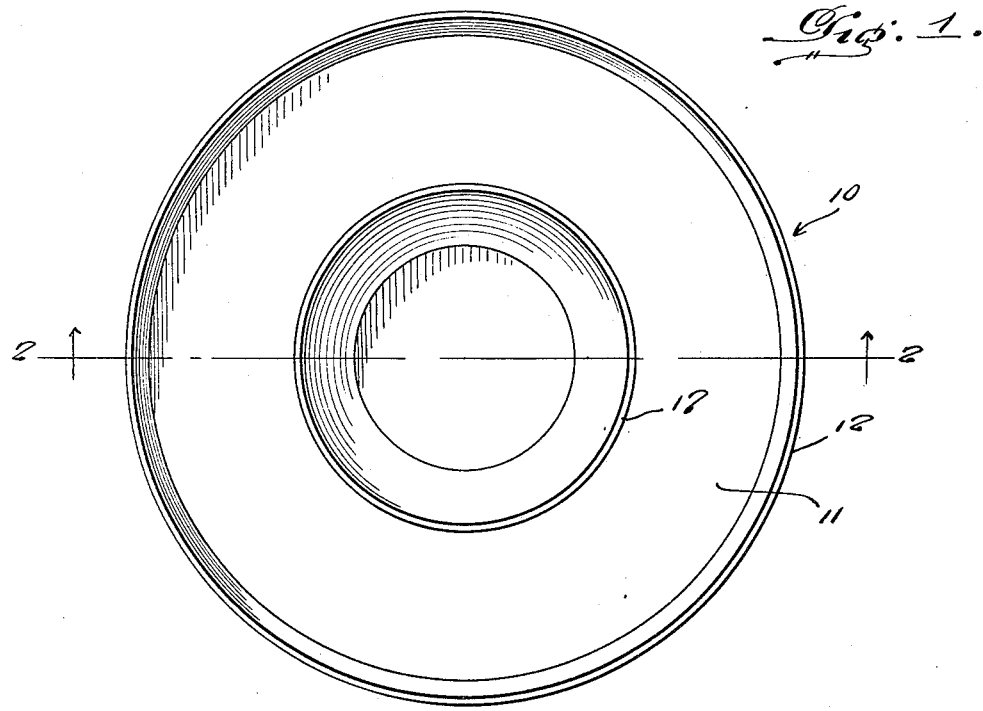
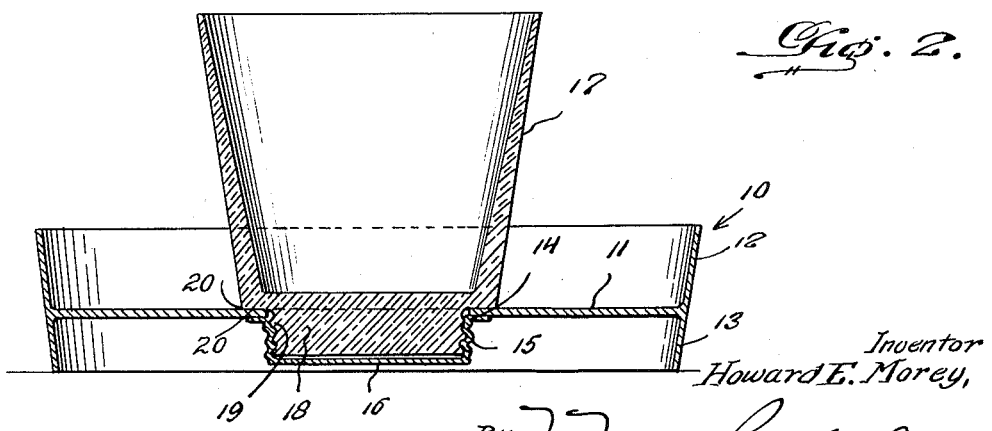
Inventor
Howard E. Morey,
Attorneys Patented Feb. 27, 1951

2,543,465

UNITED STATES PATENT OFFICE 2,543,465

ANIMAL FEEDER

Howard E. Morey, Aurora, Ill.

Application December 21, 1945, Serial No. 636,327

1 Claim. (Cl. 119—51.5)

This invention relates to a feeder or feeding trough for animals, and more particularly to such a device adapted for the feeding of rabbits or similar small animals.

A primary object of this invention is the provision of an improved feeding tray or trough, whereby the animals may be fed solid food, and having secured thereto or associated therewith a special receptacle for liquid foods or water, means being provided whereby the latter receptacle will not be upset by the animals.

An additional object of the invention is the provision of such a device which may be readily separated for cleaning or other purposes.

Still another object of the invention is the provision of such a device which will be sturdy and durable in construction, reliable and efficient in operation and simple and inexpensive to manufacture and assemble.

Other objects will in part be obvious and in part be pointed out as the description of the invention proceeds and shown in the accompanying drawings wherein there is disclosed a preferred embodiment of this inventive concept.

In the drawings:

Figure 1 is a top plan view of one form of device embodying this invention.

Figure 2 is a sectional view taken substantially along the line 2—2 of Figure 1, as viewed in the direction indicated by the arrows.

Similar reference characters refer to similar parts throughout the several views of the drawings.

Referring now to the drawings, there is generally indicated at 10 a tray or trough, which may be of circular configuration, adapted for the reception of solid food for animals such as rabbits or the like. The trough 10 includes a base 11, and a rim 12, and may, if desired, be provided with a depending flange 13, as best shown in Figure 2, for ornamental or other purposes.

The base 11 is thus, by the flange 13, spaced a substantial distance from the ground, and is provided with a centrally positioned aperture 14, below which is secured an annular depending socket member 15 provided with female threads of any desired configuration. If desired, the socket 15 may take the form of a conventional jar cap closure, provided with a base 16. The socket 15 may be secured to the base 11 surrounding the aperture 14 therein in any desired conventional manner.

The receptacle for liquids comprises a cup 17 provided at its base with a projecting portion 18, externally threaded, as indicated at 19, the threads being of a configuration adapted to engage the threads of the socket 15. An annular shoulder 20 formed on the cup just above threads 19 seats against the upper surface of base 11 when the cup is threadedly positioned, precluding injury to or breakage of socket 15 as a result of angular bending or displacement.

It will thus be seen that when the device is in assembled relation, the threads 19 engaging the threads of the socket 15 preclude the upsetting of the cup 17, and the device may be unitarily assembled, the tray 10 being filled with solid food, if desired, and the cup 17 being filled with liquid, as, for example, water.

It will be seen that due to the relatively large area of the tray 10, upsetting of the cup 17 will be substantially precluded, or may be accomplished only with material difficulty by the animals feeding from the trough.

Obviously, the device may be constructed of any desired material, as, for example, glass, thin sheet metal, plastic, or other suitable substance.

From the foregoing it will now be seen that there is herein provided an improved animal feeder which accomplishes all the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

I claim:

An animal feeder comprising a pan-like trough having a circular sidewall and a plane bottom plate vertically spaced from the upper and lower edges of said sidewall, said bottom plate being formed with a central opening, a threaded socket secured to said bottom plate and depending therefrom in registry with said opening, a removable cup larger in diameter than said opening and said socket having a plane bottom having a central threaded element depending therefrom, said depending threaded element being extended through said bottom plate opening and threaded in said socket whereby portions of the cup bottom surrounding said depending threaded element supportably engage the upper side of said trough bottom plate around the opening therein.

HOWARD E. MOREY.

(References on following page)

REFERENCES CITED

The following references are of record in the file of this patent:

UNITED STATES PATENTS

| Number | Name | Date |
|---|---|---|
| 105,061 | French | July 5, 1870 |
| 171,929 | French | Jan. 11, 1876 |
| 181,558 | Colburn | Aug. 29, 1876 |
| 466,397 | Day | Jan. 5, 1892 |
| 648,436 | Rider | May 1, 1900 |
| 687,102 | Zimmerman et al. | Nov. 19, 1901 |
| 783,706 | Soleau | Feb. 28, 1905 |
| 1,010,543 | Walter et al. | Dec. 5, 1911 |
| 1,057,889 | Sharp | Apr. 1, 1913 |
| 1,506,377 | Mandel | Aug. 26, 1924 |
| 1,919,916 | Taylor | July 25, 1933 |
| 2,191,811 | Trampier | Feb. 27, 1940 |
| 2,294,657 | Flanagan | Sept. 1, 1942 |

FOREIGN PATENTS

| Number | Country | Date |
|---|---|---|
| 1,605 | Great Britain | A. D. 1888 |
| 35,108 | Austria | Nov. 10, 1908 |